(12) United States Patent
Maynard

(10) Patent No.: US 11,178,986 B2
(45) Date of Patent: Nov. 23, 2021

(54) POSITIONING AND STABILIZING DEVICE FOR PICTURE FRAMES AND THE LIKE

(71) Applicant: Darren Mark Maynard, Tuxedo Park, NY (US)

(72) Inventor: Darren Mark Maynard, Tuxedo Park, NY (US)

(*) Notice: Subject to any disclaimer, the term of this patent is extended or adjusted under 35 U.S.C. 154(b) by 35 days.

(21) Appl. No.: 16/202,163

(22) Filed: Nov. 28, 2018

(65) Prior Publication Data

US 2019/0159610 A1     May 30, 2019

Related U.S. Application Data

(60) Provisional application No. 62/591,230, filed on Nov. 28, 2017.

(51) Int. Cl.

| | |
|---|---|
| *A47G 1/17* | (2006.01) |
| *A47G 1/16* | (2006.01) |
| *A47G 1/20* | (2006.01) |
| *F16M 11/04* | (2006.01) |
| *F16M 13/02* | (2006.01) |
| *F16B 1/00* | (2006.01) |

(52) U.S. Cl.
CPC ............. *A47G 1/17* (2013.01); *A47G 1/1606* (2013.01); *A47G 1/168* (2013.01); *A47G 1/1633* (2013.01); *A47G 1/20* (2013.01); *A47G 2001/207* (2013.01); *F16B 2001/0035* (2013.01); *F16M 11/041* (2013.01); *F16M 13/02* (2013.01); *F16M 13/022* (2013.01)

(58) Field of Classification Search
CPC ........ A47G 1/17; A47G 1/168; A47G 1/1606; A47G 1/205; A47G 1/1633; F16B 2001/0035; F16M 13/02; F16M 11/041; F16M 13/022
USPC ......................................................... 248/467
See application file for complete search history.

(56) References Cited

U.S. PATENT DOCUMENTS

| | | | | |
|---|---|---|---|---|
| 3,363,214 A | * | 1/1968 | Wright ............... | H01R 13/6205 439/39 |
| 3,521,216 A | * | 7/1970 | Tolegian ............ | H01R 13/6205 439/39 |
| 3,604,673 A | * | 9/1971 | Klein .................... | A47G 1/168 248/467 |

(Continued)

*Primary Examiner* — Jonathan Liu
*Assistant Examiner* — Taylor L Morris
(74) *Attorney, Agent, or Firm* — Cole Schotz, P.C.; Marcella M. Bodner

(57) ABSTRACT

A device is provided which assists the positioning of wall mounted articles in their preferred orientation and stabilizing them to prevent them moving. The device comprises female and male components, each of which include mating features and magnetic elements that facilitate aligning, mating and attracting the female and male components together when the device is assembled. In a method of using the device to position and stabilize an article, such as a framed picture, on a generally vertically oriented structure, such as a wall, each of the female and male components is affixed to a respective one of the back of the article and the wall such that their mating features are exposed and align and mate with one another, and the magnetic elements attract one another, thereby holding the components together, as well as holding the article to the generally vertically oriented structure in a preferred orientation.

5 Claims, 12 Drawing Sheets

(56) References Cited

U.S. PATENT DOCUMENTS

| | | | | |
|---|---|---|---|---|
| 3,786,391 A * | 1/1974 | Mathauser | ......... | H01R 13/6205 439/39 |
| 3,808,577 A * | 4/1974 | Mathauser | ......... | H01R 13/6205 439/39 |
| 3,861,639 A * | 1/1975 | Morrill | ................ | A47G 1/1606 248/489 |
| 4,083,525 A * | 4/1978 | Rath | .................... | A47G 1/1613 248/224.8 |
| 4,211,382 A * | 7/1980 | Bonfils | ................... | A47G 1/168 248/467 |
| 4,678,150 A * | 7/1987 | Newman | .................. | A47G 1/17 248/205.3 |
| 4,875,654 A * | 10/1989 | Chandonnet | ............ | A47G 1/17 248/467 |
| 5,593,120 A * | 1/1997 | Hamerski | ........... | B29C 65/0672 156/235 |
| 5,895,018 A * | 4/1999 | Rielo | ..................... | A47K 10/12 248/206.5 |
| 6,004,642 A * | 12/1999 | Langford | .................... | C09J 7/20 428/40.1 |
| 6,647,597 B2 * | 11/2003 | Reiter | ..................... | A41F 1/002 24/303 |
| 7,198,244 B2 * | 4/2007 | Deline | ................. | A47G 1/1606 24/614 |
| 7,207,543 B2 * | 4/2007 | Ortwein | ................ | F16B 11/006 248/467 |
| 7,246,384 B2 * | 7/2007 | Bentz | ....................... | A42B 3/08 2/421 |
| 7,275,334 B2 * | 10/2007 | Horst | ..................... | A47G 1/205 248/467 |
| 7,654,500 B1 * | 2/2010 | Jump | ................... | A47G 1/1613 248/476 |
| 7,744,051 B2 * | 6/2010 | Joyce | ................... | A47F 5/0807 248/206.5 |
| 7,810,771 B1 * | 10/2010 | Akers | ..................... | E04G 21/24 160/368.1 |
| 8,434,730 B2 * | 5/2013 | Ahlstrom | ............... | A47G 1/168 248/206.5 |
| 8,525,626 B2 * | 9/2013 | Tait | ....................... | H01F 7/0252 335/285 |
| 9,153,152 B1 * | 10/2015 | Elmer | .................. | H01F 7/0221 |
| 9,408,482 B2 * | 8/2016 | Nesbitt | .................. | A47G 1/065 |
| 10,709,269 B2 * | 7/2020 | Franco | .................. | F16M 13/02 |
| 2005/0045784 A1 * | 3/2005 | Pitlor | ...................... | H02G 3/20 248/206.5 |
| 2007/0151136 A1 * | 7/2007 | Dandie | ............... | A47G 1/0627 40/711 |
| 2007/0286704 A1 * | 12/2007 | Signor | .................. | A47G 1/168 411/458 |
| 2008/0237433 A1 * | 10/2008 | Hardin | ..................... | B44C 5/02 248/467 |
| 2008/0297438 A1 * | 12/2008 | Lin | ........................ | A47G 1/142 345/30 |
| 2009/0140120 A1 * | 6/2009 | Nicolaisen | ................ | A47G 1/17 248/467 |
| 2013/0146738 A1 * | 6/2013 | Jaeger | ..................... | A47G 1/17 248/467 |
| 2014/0061409 A1 * | 3/2014 | Mayhew, Jr. | ......... | F16M 13/02 248/206.5 |
| 2016/0003270 A1 * | 1/2016 | Franklin | ................ | F16M 11/14 439/529 |
| 2016/0040825 A1 * | 2/2016 | Franklin | ................... | F16B 1/00 439/39 |
| 2016/0150861 A1 * | 6/2016 | Yao | ...................... | H04B 1/3888 224/245 |
| 2016/0309927 A1 * | 10/2016 | Krake | ....................... | G09F 7/18 |
| 2017/0220204 A1 * | 8/2017 | Huang | .................. | A47G 1/168 |
| 2017/0311740 A1 * | 11/2017 | Leroux | ................. | A47G 1/1606 |
| 2017/0354275 A1 * | 12/2017 | Hatamian | ............. | F16M 13/02 |
| 2018/0073252 A1 * | 3/2018 | Janko | ....................... | A47G 1/17 |
| 2018/0220816 A1 * | 8/2018 | Rajeski | .................. | A47G 1/215 |

\* cited by examiner

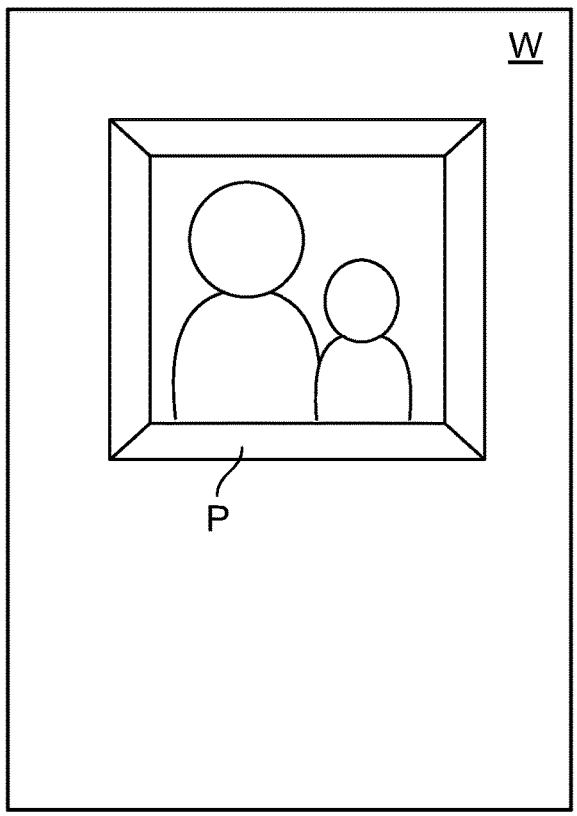
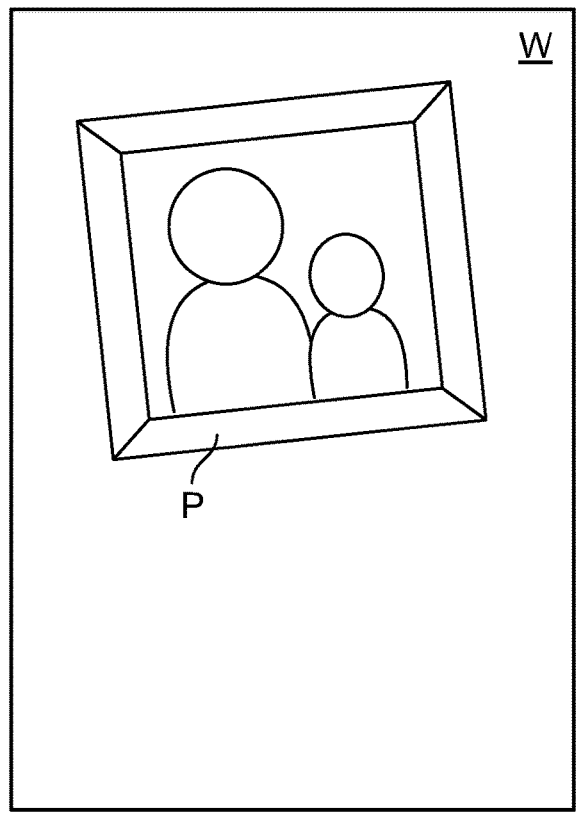
FIG. 19A                    FIG. 19B

POSITIONING AND STABILIZING DEVICE FOR PICTURE FRAMES AND THE LIKE

CROSS-REFERENCE TO RELATED APPLICATIONS

The present application claims the benefit of U.S. Provisional Application No. 62/591,230, filed Nov. 28, 2017, the entire disclosure of which is hereby incorporated by reference herein.

FIELD OF THE INVENTION

The present invention relates generally to a device for positioning and stabilizing an article, such as a picture frame, sculpture, or other wall mounted article when hung on or mounted to a wall or other generally vertically oriented structure.

BACKGROUND OF THE INVENTION

Framed or unframed pictures, posters, art, sculptures, etc., and other wall mounted articles are typically mounted or hung on walls, or other generally vertically oriented structures, in a preferred orientation. For example, a framed picture having an overall rectangular or square shape will typically be hung in a "straight" orientation, with one of its straight sides being parallel to the floor. There is typically a preferred orientation even for articles having non-rectangular shapes, such as round or irregular shapes (e.g., a wall sculpture).

Wall mounted articles are generally mounted using a combination of nails, rings, hooks, wire, brackets, and other hardware, many of which provide a single point of attachment between the article and the wall. An article hung in this manner will often shift or more away from (or out of) the preferred orientation. Even articles hung using hardware that provides more than one point of attachment may shift away from their preferred orientation after mounting. Such undesired movement requires someone to adjust the article and move it back to the preferred orientation. This can be a recurring problem. Thus, there is a need for a stabilizing device to assist in the positioning of wall mounted articles in the preferred orientation and stabilizing them to prevent them from shifting away from the preferred orientation.

SUMMARY OF THE INVENTION

The present invention relates to a positioning and stabilizing device for positioning and stabilizing an article hung on or mounted to a wall or other generally vertically oriented structure, and methods for using the device to stabilize the article in a preferred position.

Generally, the device comprises a female component which includes a female component body with a female mating face and at least one first mating feature positioned on or proximate the female mating face, and a male component which includes a male component body with male mating face and at least one second mating feature positioned on or proximate the male mating face. Additionally, the female component further includes a first magnetic element also positioned on or proximate the female mating face, and a first face opposite the female mating face. The male component further includes a second magnetic element positioned on or proximate the male mating face, and a second face opposite the male mating face. The first and second mating features are positioned on the respective female and male mating faces and align, contact and mate with one another when the device is assembled, and the first and second magnet elements are positioned on or proximate the respective female and male mating faces and align, contact and attract one another when the device is assembled.

In some embodiments, the first magnetic element is a magnet and the second magnetic element is a magnetically receptive wafer. In some further embodiments, the magnet is received and affixed in a magnet recess provided on the female mating face of the female component body and the magnetically receptive wafer is received and affixed in a wafer recess provided on the male mating face of the male component body. The magnetically receptive wafer may be, for example, a metal wafer. The magnet may, for example, be made of neodymium. In some embodiments, the first magnetic element may be a magnetically receptive wafer and the second magnetic element may be a magnet.

In some embodiments, the first mating feature may comprise one or more indents on the female mating face of the female component body, and the second mating feature may comprise one or more protrusions on the male mating face of the male component body, where the indents are each sized and shaped to complement and mate with a corresponding one of the protrusions, and wherein the indents and protrusions are positioned on the respective female and male mating faces such that they align, contact and mate with one another when the device is assembled.

In some embodiments, the device may also include first and second affixing agents, where the first affixing agent is affixed to a first surface on the first face of the female component body, wherein the second affixing agent is affixed to a second surface on the second face of the male component body. One or both of the first and second affixing agents may each be a double sided adhesive foam piece with an adhesive applied to both sides thereof. The adhesive may be a pressure sensitive adhesive.

The present invention also relates to a method of positioning and stabilizing an article on a generally vertically oriented structure having a generally vertical mounting surface, with the device of claim 1. This method comprising the steps of: affixing one of the female and male components of the device to a back surface of the article with its mating surface exposed, and affixing the other of the female and male components of the device to the generally vertical mounting surface with its mating surface exposed and in a predetermined position where the female and male components will align and the female and male mating surfaces will contact, mate with and attract one another; and mounting the article on the generally vertical mounting surface. The method further comprises the step of: assembling the device by aligning and mating the female and male components together, thereby holding the article in a preferred orientation on the generally vertical mounting surface. In some embodiments, the device may further comprise first and second affixing agents which are affixed to the first and second faces of the female and male component bodies for performing the steps of affixing the affixing the female and male components of the device to the back surface of the article and the generally vertical mounting surface.

BRIEF DESCRIPTION OF THE DRAWINGS

The present invention will be further explained with reference to the attached drawings, wherein like structures are referred to by like numerals and/or letters throughout the several views. The drawings shown are not necessarily to scale, with emphasis instead generally being placed upon illustrating the principles of the present invention.

FIGS. 19A and 19B provide schematic diagrams showing a framed picture mounted on a wall in its preferred orientation and in a disfavored skewed orientation, respectively;

DETAILED DESCRIPTION OF THE INVENTION

Figure 1:
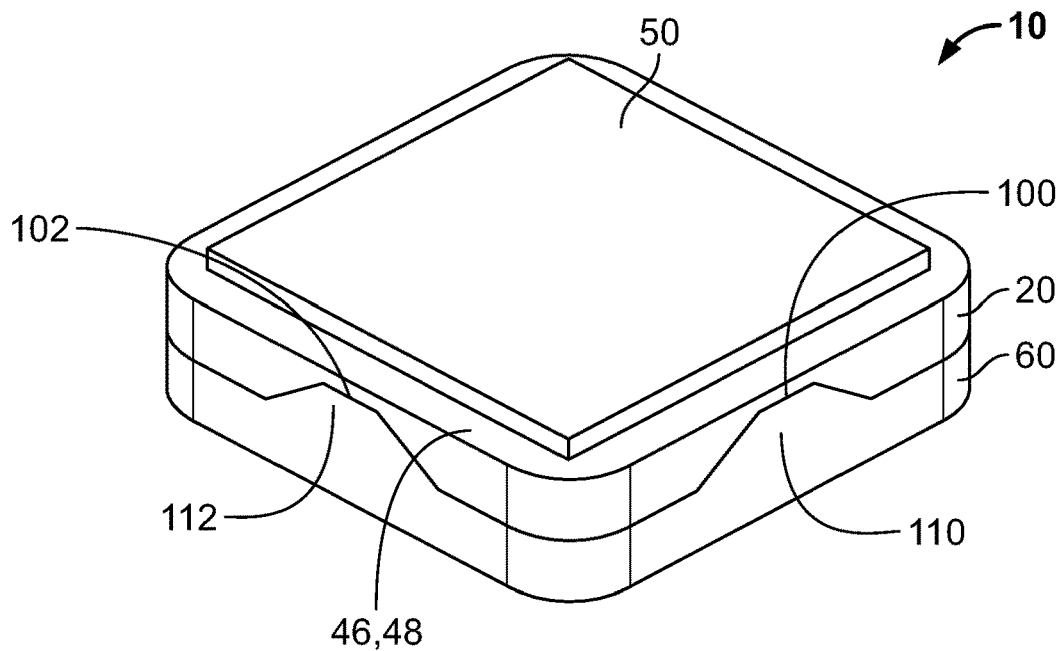
FIG. 1 is a perspective view of an assembled positioning and stabilizing device having female and male components mated together according to the present invention.

Detailed embodiments of the present invention are disclosed herein. It should be understood that the disclosed embodiments are merely illustrative of the invention which may be embodied in various forms. In addition, each of the examples given in connection with the various embodiments of the invention is intended to be illustrative, and not restrictive. Further, the figures are not necessarily to scale, and some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as examples for teaching one skilled in the art to make and use the present invention.

As used herein, all numerical values or ranges specified herein include fractions of the values and integers within such ranges and fractions of the integers within such ranges unless the context clearly indicates otherwise. Additionally, all ranges specified are inclusive of their endpoints, as well as sub-ranges within the greater range and ranges which overlap other ranges. For example, a numerical range, such as from 1 to 10 includes 1, 2, 3, 4, 5, 6, 7, 8, 9, 10, as well as 1.1, 1.2, 1.3, 1.4, 1.5, etc., and so forth. Where multiple numerical ranges are specified herein, they may overlap, and additional ranges may include endpoints within different consecutive or overlapping ranges. For example, where numerical ranges of from 1 to 10 and from 11 to 20 are specified, an additional range of from 5 to 18 is also understood to be applicable to the apparatus and methods contemplated and described herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the terms "at least one" or "plurality" will be understood to include one as well as any quantity more than one, including but not limited to, 2, 3, 4, 5, 6, 7, 8, 9, 10, 15, 20, 30, 40, 50, 100, or any integer inclusive therein, and/or any range described herein. The terms "at least one" or "plurality" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

The positioning and stabilizing device described herein assists in the positioning of wall mounted articles in their preferred orientation and stabilizing them to prevent them from shifting away the preferred orientation. Wall mounted articles include, but are not limited to, frame and unframed pictures, photos, art, posters, and sculptures. Additionally, while the aforesaid device will be described in detail hereinafter as used to position and stabilize wall mounted articles to a wall, the device is also suitable for use to mount such articles to other generally vertically oriented structures such as, without limitation, screens, panels, windows, doors, trees, scaffolds, and the like. Moreover, it should be understood that the generally vertically oriented structures include those having surfaces which are vertically oriented (i.e., about 90°) or are angled or tilted (such as between about 45° and 90°), relative to the ground or floor. Rather, persons of ordinary skill will recognize that the positioning and stabilizing device described herein is advantageous for use many types of mounted articles and structures where positioning and minimizing or preventing movement of the mounted articles from a preferred orientation is desired.

FIGS. 1-18 show one embodiment of a positioning and stabilizing device 10 and its components, according to the present invention. More particularly, the device (i.e., a complete unit) 10 comprises female and male components, such as the upper and lower halves 20, 60, which are shown assembled and mated together in FIG. 1, separated and disassembled in FIG. 2, and in an intermediate partially assembled state in FIG. 18. As will be described hereinafter, the female and male components 20, 60 each have complementary first and second mating features that facilitate relative positioning and mating closely together with one another. The female and male components 20, 60 also include first and second magnetic elements that provide magnetic attraction to draw and hold the components 20, 60 together while positioning and mating them and after installation.

As seen most clearly in FIGS. 2-5 and 8-9, the female component (i.e., upper half) 20 of the device 10 comprises a first magnetic element, such as a magnet 30, a female component body 40, and a first affixing agent 50. The female component body 40 has a female mating face 42 with a magnet recess 44 for receiving the magnet 30 therein, and a first face (or reverse side) 46 with a first surface 48 opposite the female mating face 42.

Figure 2:
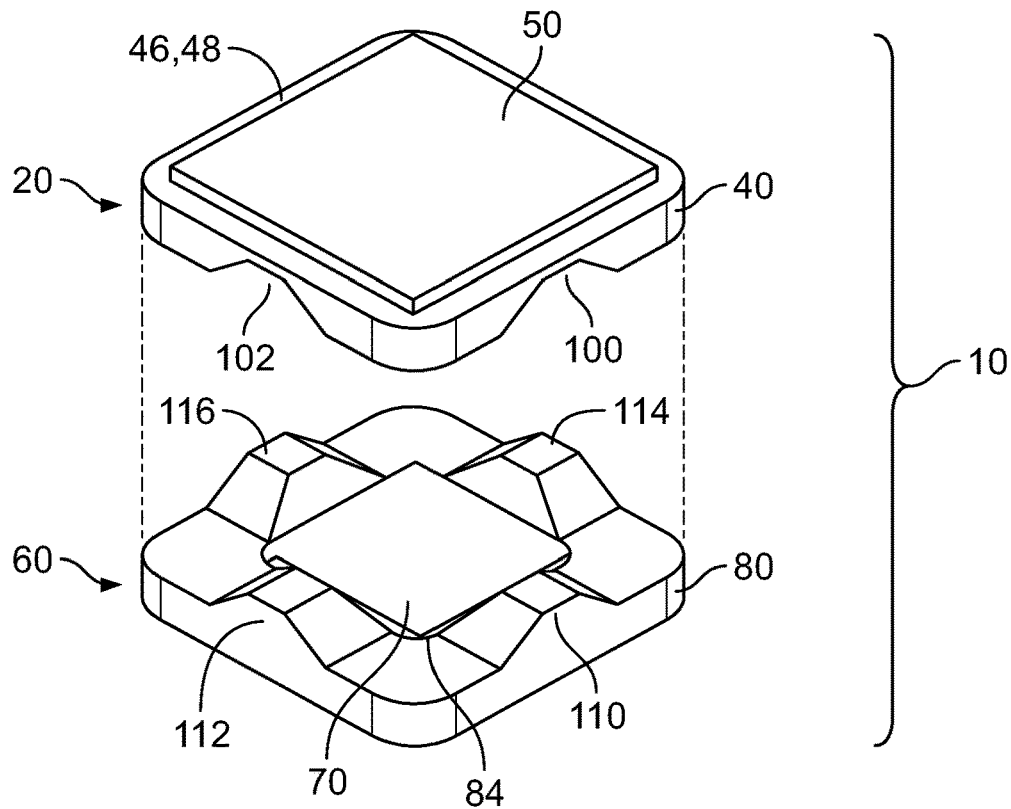
FIG. 2 is a perspective view of the positioning and stabilizing device of FIG. 1 in a disassembled state showing the female and male components separated and in which the assembled male component body and metal wafer are visible.
Figure 3:
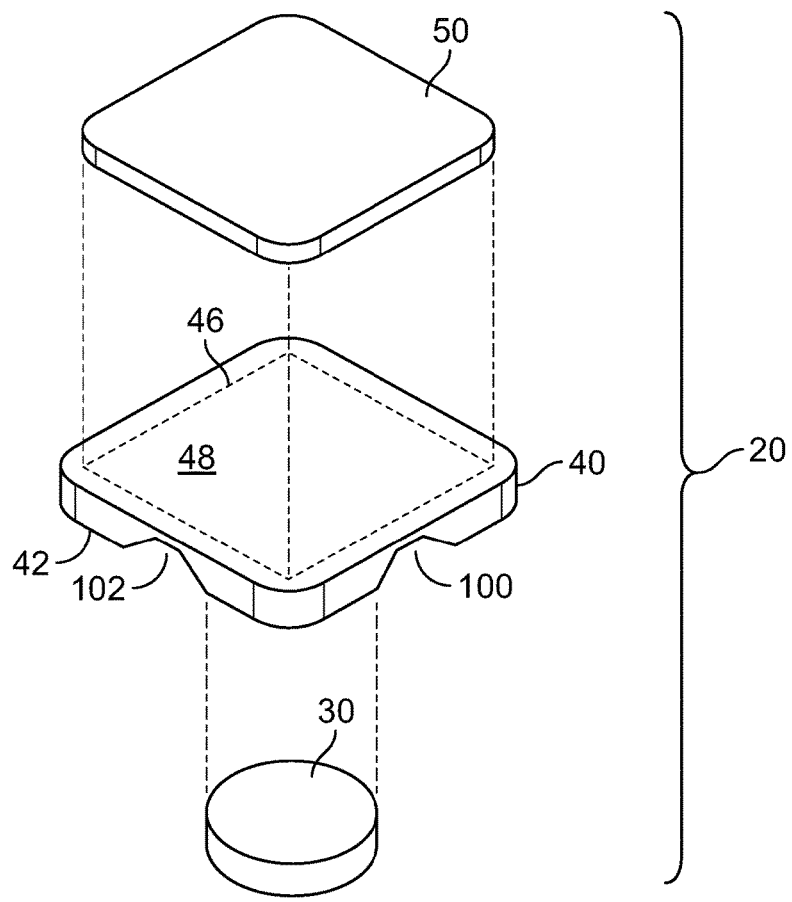
FIG. 3 is an exploded perspective view of the female component of the device, in which the first surface of the female component body is visible.

The first affixing agent, such as a first piece of two sided adhesive foam 50, is affixed to the first surface 48 of the female component body 40 with a pressure sensitive adhesive, for a purpose to be described hereinafter. As shown in FIGS. 1-3, in some embodiments, the foam piece 50 is sized and shaped so as not to extend beyond the first surface 48 of the female component body 40. Additionally, the foam piece 50 has a thickness which will vary depending on the overall size of the device 10, the expected size of the wall mounted article with which the device 10 is intended to be used, as well as the characteristics of the wall or other generally vertically oriented mounting surface on which the article is to be hung. While the thickness of the foam piece 50 is not particularly limited, in some exemplary embodiments of the device 10, the foam piece 50 will have a thickness in the ranger of from about 1/32 inch to about 3/8 inch, such as for example without limitation, from about 1/32 inch to about 1/8 inch, or even from about 1/32 inch to 1/16 inch. Without limitation, for example, a smaller thickness (e.g., about 1/32 inch to about 1/16 inch) of the foam piece 50 will be suitable for use with generally vertically oriented structures having generally vertical mounting surfaces which are untextured or lightly textured, while a greater thickness (e.g., about 1/16 inch to about 1/8 inch) for the foam piece 50 will be suitable for most textured generally vertical mounting surfaces (e.g., covered with textured wall paper), and an even greater thickness (e.g., about 1/8 to about 1/4 inch) for the foam piece 50 will be suitable for generally vertical mounting surfaces having a rougher or deeper texture (e.g., stucco coating). Selection of a suitable thickness for the foam piece 50 is well within the ability of persons of ordinary skill in the relevant art.

Figure 6:
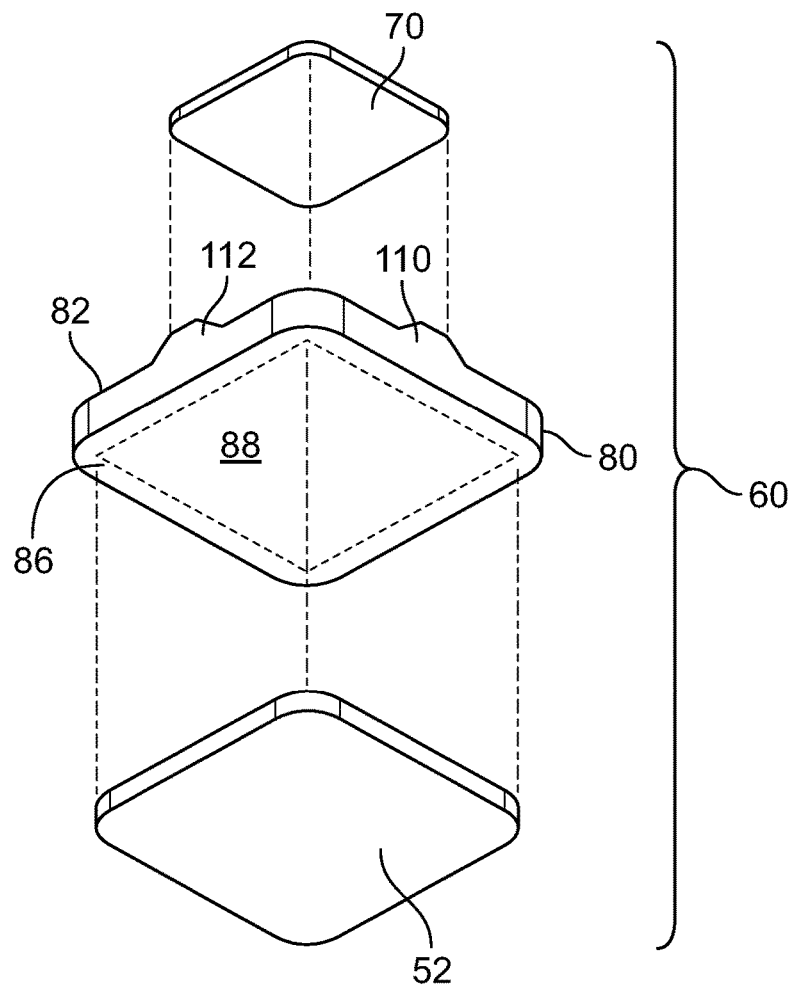
FIG. 6 is an exploded perspective view of the male component of the device, in which the second surface of the male component body is visible.
Figure 7:
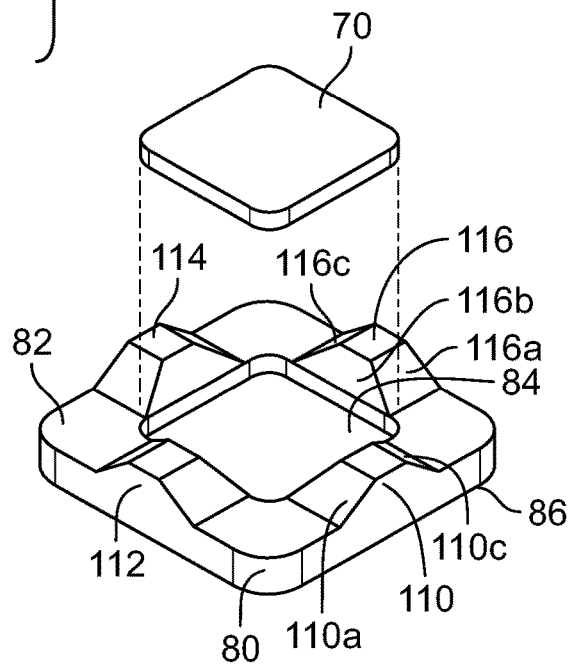
FIG. 7 is an exploded perspective view of the male component body and metal wafer in which the mating surface and wafer recess of the male component body are visible.
Figure 8:
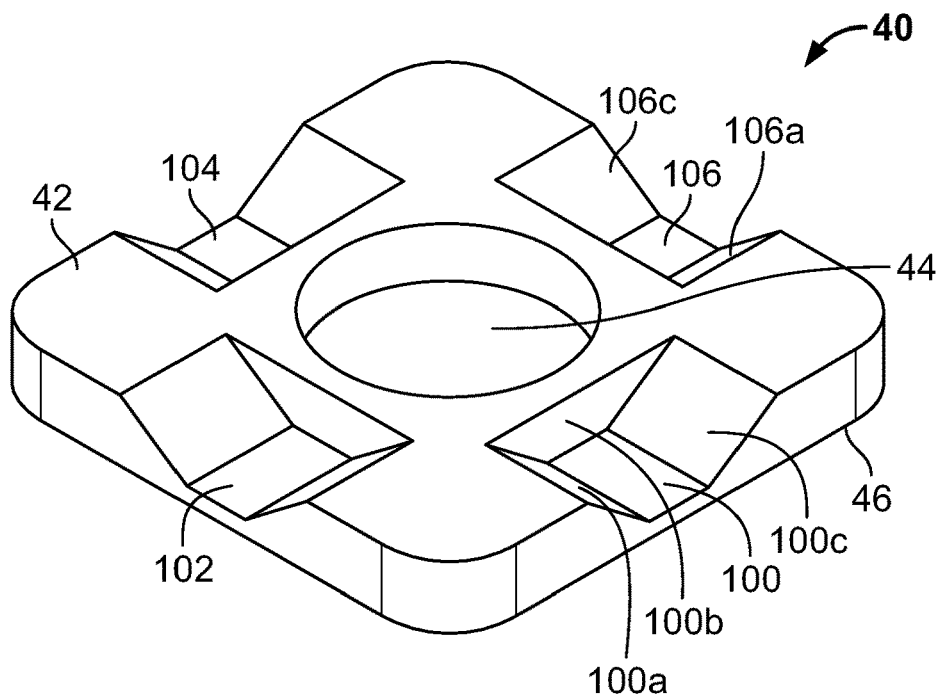
FIG. 8 is a perspective view of the female component body showing the mating surface and mating features thereof.
Figure 9:
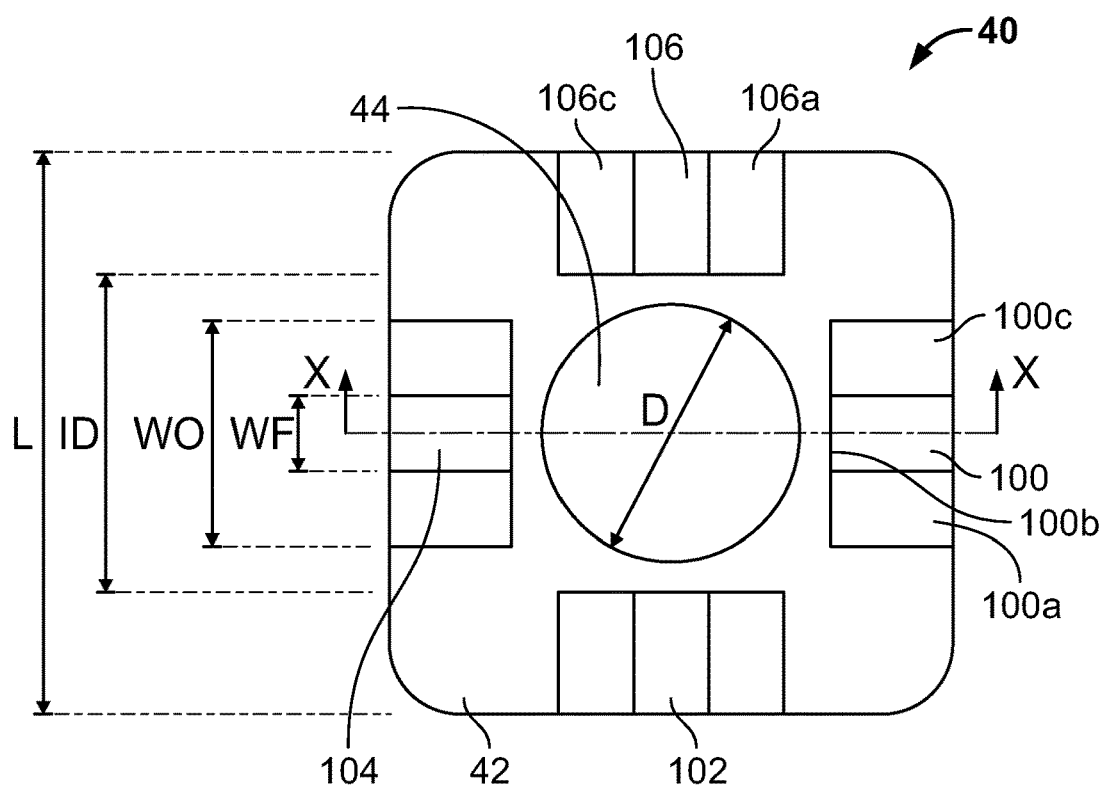
FIG. 9 is a top plan view of the female component body of FIG. 8.
Figure 10:
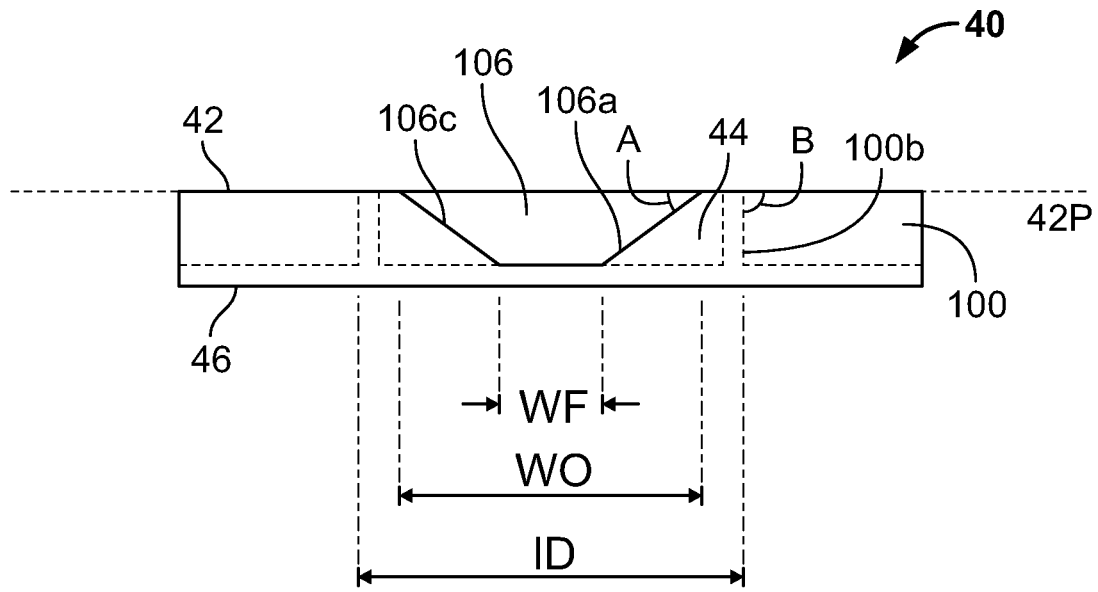
FIG. 10 is an elevational front view of the female component body of FIGS. 8 and 9, each of the back, left and right side views being identical thereto.
Figure 11:
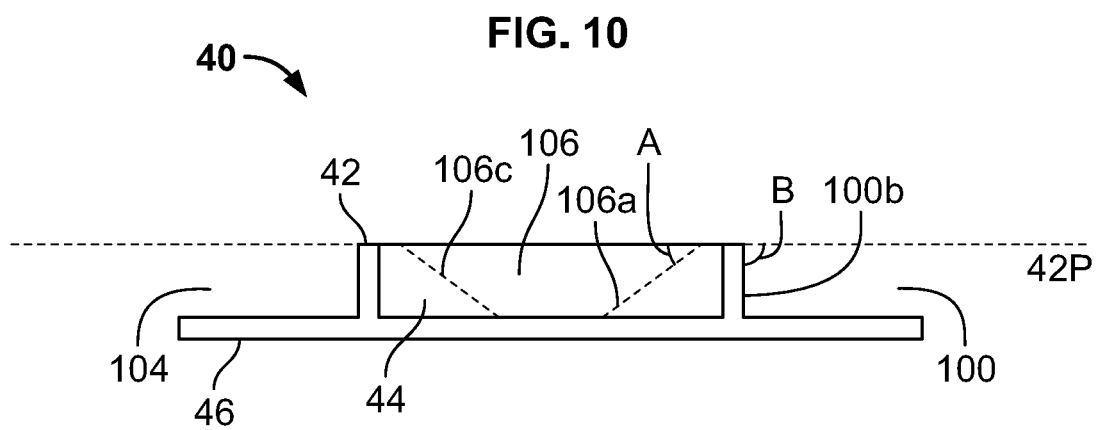
FIG. 11 is an elevational cross-sectional view of the female component body of FIG. 9 taken along line X-X and looking in the direction of the arrows.

With reference now to FIGS. 2, 6-7 and 9, the male component (i.e., lower half) 60 of the device 10 comprises a second magnetic element, such as a magnetically receptive wafer (e.g., a metal wafer or shim) 70, a male component body 80, and a second affixing agent 52. The male component body 80 has a male mating face 82 with a wafer recess 84 for receiving the metal wafer 70 therein, and a second face (or reverse side) 86 with a second surface 88 opposite the male mating face 82. The first and second magnetic elements 30, 70 are positioned on the respective female and male mating faces 42, 82 to align, contact and attract one another when the device is assembled. The second affixing agent, such as a second piece of two sided adhesive foam 52, is affixed to the second surface 88 of the male component body 80 with a pressure sensitive adhesive, for a purpose to be described hereinafter. As shown in FIG. 6, in some embodiments, the foam piece 52 is sized and shaped so as not to extend beyond the second surface 88 of the male component body 80.

As previously mentioned above, the female and male components 20, 60 each have first and second mating features which complement one another and facilitate positioning and mating the female and male component bodies 40, 80 closely together to form the assembled positioning and stabilizing device (see FIG. 1). As shown in FIGS. 1-18, in one embodiment, for example without limitation, the first mating feature may include indents 100, 102, 104, 106 positioned on the female component body 40 and the second mating feature may include protrusions 110, 112, 114, 116 on the male component body 80, respectively. The indents 100, 102, 104, 106 and the protrusions 110, 112, 114, 116 are each sized and shaped to match and fit together (i.e., corresponding) when the female and male components 20, 60 are assembled together. For example, as can be seen in FIG. 2, a front indent 100 of the female component body 40 matches and mates with a front protrusion 110 of the male component body 80, while a side indent 102 of the female component body 40 matches and mates with a side protrusion 112 of the male component body 80.

It is not necessary for all of the indents 100, 102, 104, 106 to be on the female component body 40 and all of the protrusions 110, 112, 114, 116 to be on the male component body 80. Rather, for example without limitation, there may be one or more indents and protrusions on the female component body 40, with corresponding indents and protrusions on the male component body 80, as long as all indents and protrusions are sized and shaped to correspond with their counterparts to facilitate and enable positioning and mating the female and male component bodies 40, 80 (and, therefore, the female and male components 20, 60) together to the form the assembled device 10. As will become clear hereinafter, the first and second mating features (e.g., the indents 100, 102, 104, 106 on the female component body 40 and the protrusions 110, 112, 114, 116 on the male component body 80) must be positioned on the respective female and male mating faces 42, 82 to align, contact and mate with one another when the device 10 is assembled.

Of course, although not shown in the figures, as will also be readily understood by persons of ordinary skill in the relevant art, mating features other than complementary indents 100, 102, 104, 106 and protrusions 110, 112, 114, 116 on the female and male mating faces 42, 82 of the female and male component bodies 40, 80 are possible and well within the scope of the device 10 contemplated and described herein. For example, without limitation, mating features may be provided on each of the female and male mating faces 42, 82 that comprise complementary patterns including ridges and valleys, sinewave or other curvilinear patterns, holes and pegs, or any other such matching features, or combinations thereof.

With reference now to FIGS. 4, 5, 8 and 9, first mating feature of the female component body 40 of the female component 20 include at least one, such as without limitation a plurality of, indents 100, 102, 104, 106 on the female mating face 42 thereof. While the following description is focused on two particular indents 100, 106 of the female component body 40, in the embodiment shown in FIG. 1-18, each of the indents 100, 102, 104, 106 is similarly formed and shaped even though not specifically labeled. Each indent 100, 102, 104, 106, for example indent number 100 in FIGS. 4-5 and 8-13, is defined by at least one, such as without limitation a plurality of, walls 100a, 100b, 100c, one of which is an interior wall 100b and two of which are first and second end walls 100a, 100c.

With reference now to FIGS. 2, 7, 10 and 11, second mating feature of the male component body 80 include at least one, such as without limitation a plurality, of tabs or protrusions 110, 112, 114, 116 on the male mating face 82 thereof. Each protrusion 110, 112, 114, 116 extends from the male mating surface 82 in a direction away from the second face of the male component body 80. While the following description is focused on two particular protrusions 110, 116 of the male component body 80, in the embodiment shown in FIG. 1-18, each of the protrusions 110, 112, 114, 116 is similarly formed and shaped even though not specifically labeled. Each protrusion 110, 112, 114, 116, for example protrusion number 110 in FIGS. 2, 7 and 14-17, is defined by at least one, such as without limitation a plurality of, sides 110a, 110b, 110c, one of which is an interior side 110b and two of which are first and second end sides 110a, 110c.

Where the first and second mating features on the female and male mating surfaces 42, 82 of the component bodies 40, 80 are indents 100, 102, 104, 106 and protrusions 110, 112, 114, 116 located on their respective female and male mating faces 42, 82, and which are sized and shaped to cooperate and mate with one another, as will be readily understood by persons of ordinary skill in the relevant art, various configurations of the indents 100, 102, 104, 106 and protrusions 110, 112, 114, 116 are possible. For example, although not shown in the figures, each of the first and second end walls of each indent may be positioned at an angle of about 90° relative to the plane (42P) of the female mating face 42 of the female component body 40. Alternatively, in some embodiments such as that shown in FIGS. 4, 5 and 8-11, and with specific reference to FIGS. 10 and 11 and to indent 106 and its first and second end walls 106a, 106c, the respective first and second end walls 106a, 106c of each indent 106 may (independently if desired) be positioned at an angle (A) of less than 90°, for example without limitation less than about 90° and greater than about 40°, relative to the plane (42P) of the female mating face 42, thereby forming a wider opening to receive the corresponding protrusion 110 of the male component body 80.

Figure 12:
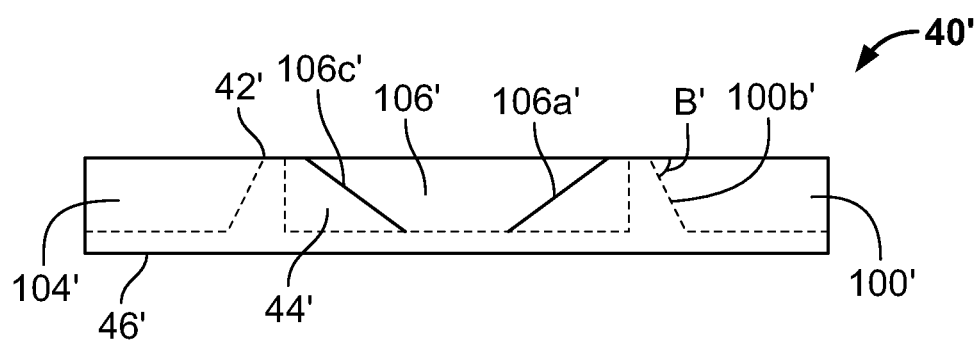
FIG. 12 is an elevational front view of an alternative embodiment of a female component body.
Figure 13:
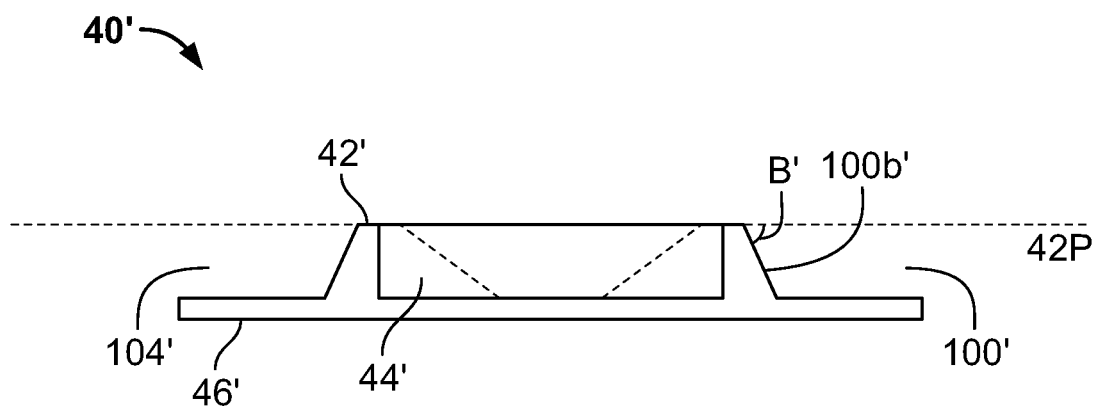
FIG. 13 is an elevational cross-sectional view, analogous to FIG. 11, of the alternative embodiment of the female component body of FIG. 12.
Figure 14:
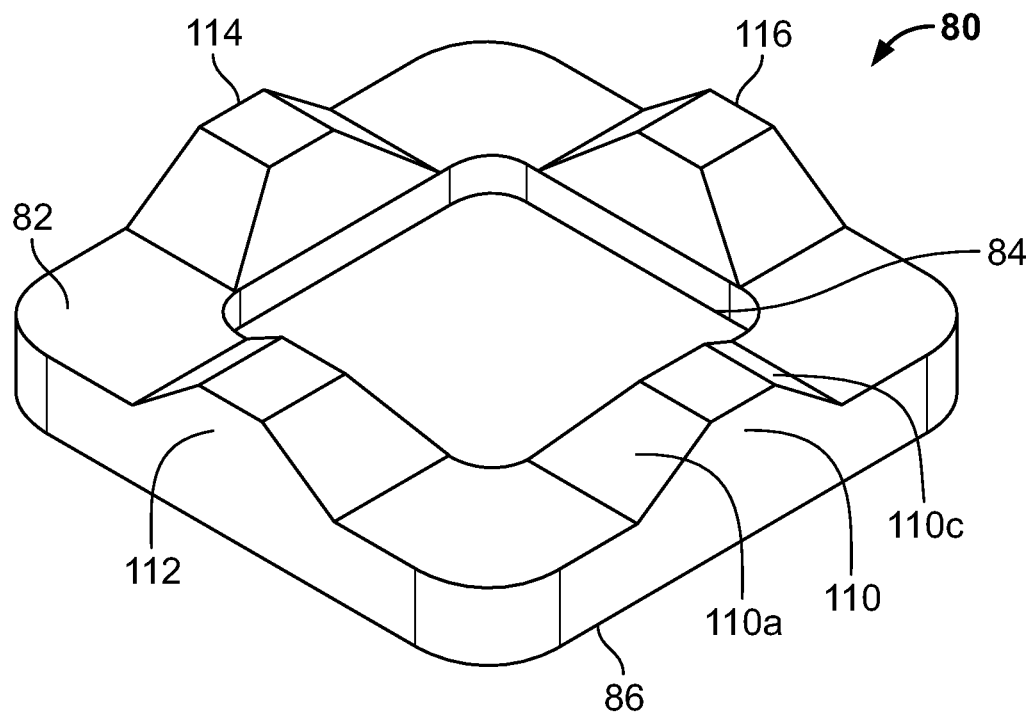
FIG. 14 is a perspective view of the male component body showing the mating surface and mating features thereof.
Figure 15:
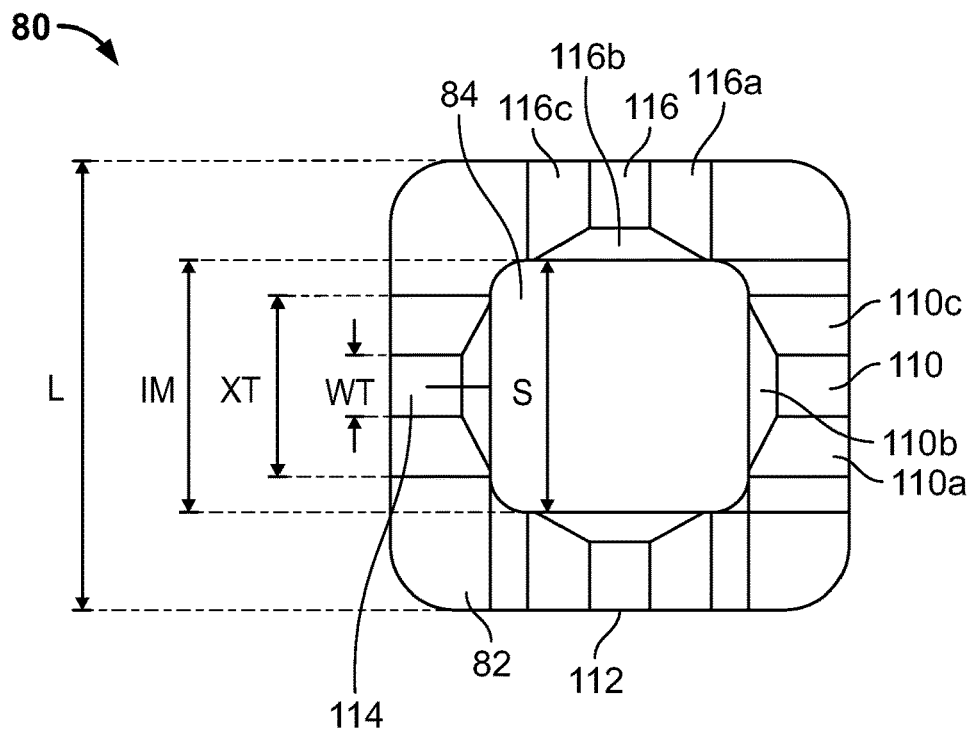
FIG. 15 is a top plan view of the male component body of FIG. 14.

Additionally, while FIGS. 4, 5 and 8-11 show the interior wall 100b of the indent 100 of the present embodiment of the device 10 being positioned at an angle (B) of about 90° to the plane (42P) of the female mating face 42 of the female component body 40 (see FIGS. 10 and 11), in an alternative embodiment of the female component body 40' shown in FIGS. 12 and 13, the interior wall 100b' of each indent 100' may be positioned at an angle (B) of less than 90°, for example without limitation less than about 90° and greater than about 40°, relative to the plane (42P) of the female mating face 42', to further facilitate insertion of the corresponding protrusions 110 of the male component body 80 into the indents 100'. When used herein to describe the size of the angle between any of the walls (e.g., 100a, 100b, 100c, 116a, 116b, 116c) of any of the indents (e.g., 110, 106) and the plane (42P) of the female mating face 42, the term "about" means±2°.

With reference now to the protrusions 110, 112, 114, 116 of the male component body 80, although not shown in the figures, each of the first and second end sides of each protrusion may be positioned at an angle of about 90° relative to the plane (82P) of the male mating face 82 of the male component body 80. Alternatively, in some embodiments such as that shown in FIGS. 2, 7, 14-17, and with specific reference to FIG. 16 and to protrusion 116 and its first and second end sides 116a, 116c, the respective first and second end sides 116a, 116c of each indent 116 may (independently if desired) be positioned at an angle (C) of less than 90°, for example without limitation less than about 90° and greater than about 40°, relative to the plane (82P) of the male mating face 82, thereby facilitating insertion of the protrusion 116 into the corresponding indent 106 of the female component body 40.

Figure 16:
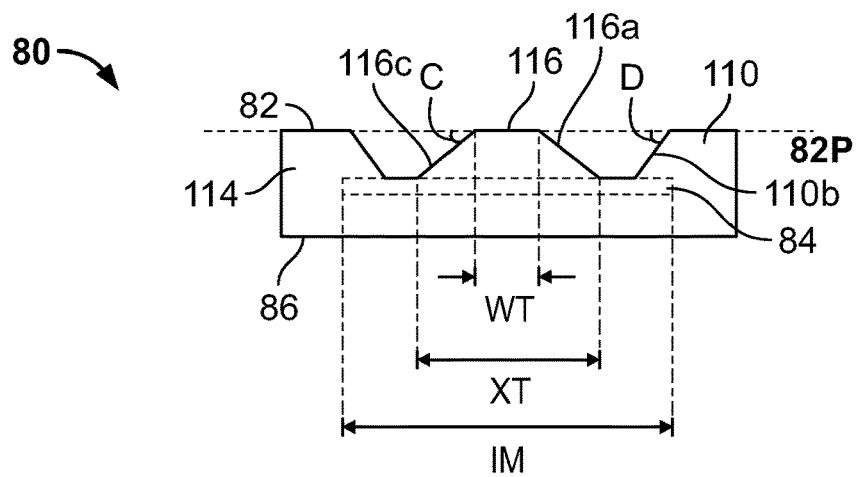
FIG. 16 is an elevational front view of the male component body of FIGS. 14 and 15, each of the back, left and right side views being identical thereto.
Figure 17:
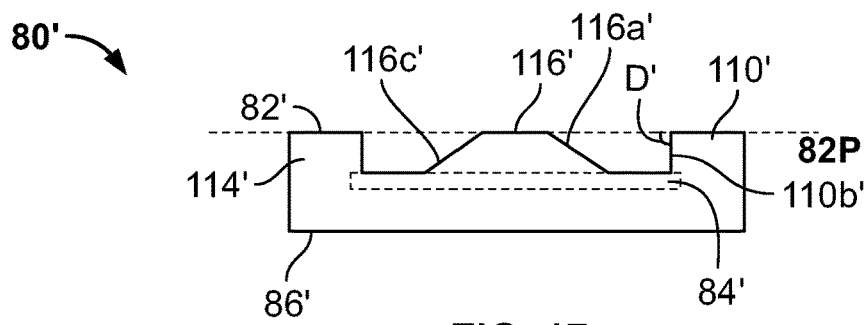
FIG. 17 is an elevational front view of an alternative embodiment of a male component body.
Figure 18:
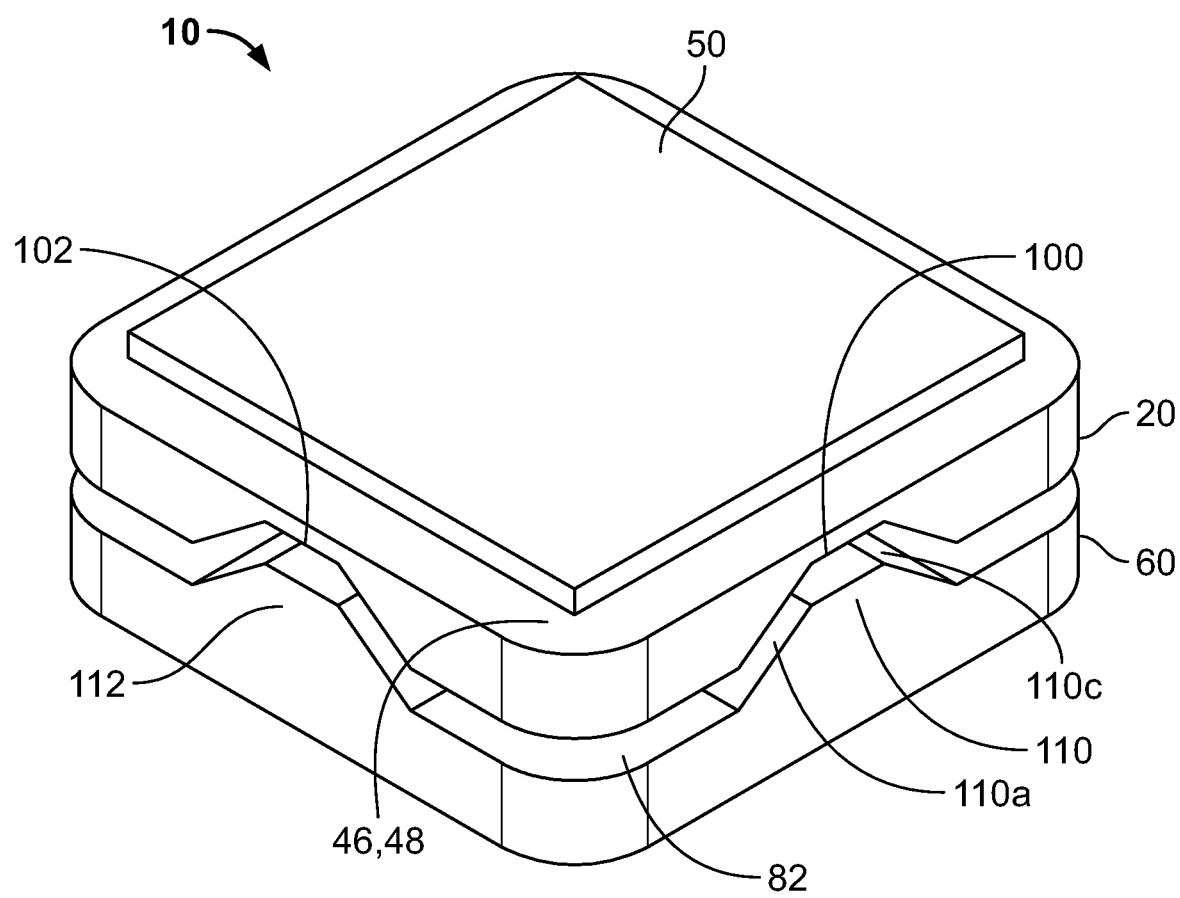
FIG. 18 is a perspective view of the positioning and stabilizing device in a state intermediate assembled and disassembled and showing the female and male components partially separated.

Furthermore, in some embodiments such as that shown in FIGS. 2, 7, and 14-17, and with specific reference to FIG. 16 and protrusion 110, the interior side 110b of the protrusion 110 may be positioned at an angle (D) of less than 90°, for example without limitation less than about 90° and greater than about 40°, relative to the plane (82P) of the male mating face 82, thereby facilitating insertion of the protrusion 110 on the male component body 80 into the corresponding indent 100 of the female component body 40. As shown in FIG. 17, in an alternative embodiment of the male component body 80', the interior side 110b' of the protrusion 110' may be positioned at an angle (D) of about 90° relative to the plane (82P) of the male mating face 82' of the male component body 80'. When used herein to describe the size of the angle between any of the sides (e.g., 110a, 110b, 110c, 116a, 116b, 116c) of any of the indents (e.g., 110, 116) and the plane (42P) of the female mating face 42, the term "about" means±2°.

Each of the female and male component bodies 40, 80 may be formed by techniques known now or on the future to persons of ordinary skill in the relevant art. For example, such forming techniques include, but are not limited to, molding, cutting, shaving, injection molding, and milling. Suitable materials for making the female and male component bodies 40, 80 include, for example without limitation, acrylonitrile butadiene styrene (ABS), polyethylene, polypropylene, polycarbonate, polyamide (e.g., nylon), high impact polystyrene, polyoxymethylene, polycarbonate/ABS blends or copolymers, acrylic, polyetherimide, nylon with 32% glass fiber, and styrene. Particularly suitable materials for the female and male component bodies 40, 80 are acrylonitrile butadiene styrene (ABS), polyethylene, polypropylene, polycarbonate, polyamide (e.g., nylon), and high impact polystyrene.

In some embodiments, instead of affixing the magnet 30 and metal wafer 70 with adhesive into the recesses 44, 84 of the female and male component bodies 40, 80, the magnet 30 and metal wafer 70 may be molded or otherwise set into the female and male component bodies 40, 80, respectively, during the forming process by techniques known now or in the future by persons of ordinary skill in the relevant art. In other embodiments, although not shown in the figures, in place of or in addition to the foregoing affixing techniques, the female and male component bodies 40, 80 may be formed having retention tabs or protrusions (either integral or separate from the female and male component bodies 40, 80) for retaining the magnet 30 and metal wafer 70 on their respective female and male mating faces 42, 82. Furthermore, in place of or in addition to the foregoing techniques for affixing each of the first and second magnetic elements (e.g., a magnet 30 and a metal wafer 70) to a respective one of the female and male component bodies 40, 80, retaining tabs, rings, plates, and the like, may be used. It is further contemplated that in some embodiments of the device, one or both of the female and male component bodies 40, 80 lack recesses 44, 84 on their mating faces 42, 82, respectively, as long as the first and second magnetic elements (e.g., a magnet 30 and a metal wafer 70) are at least partially exposed at, or sufficiently proximate to, their respective mating surfaces 42, 82 and able to attract one another, thereby mating the female and male component bodies 40, 80 together when the device 10 is assembled.

Where the first magnetic element is a magnet 30, suitable materials for the magnet 30 include, for example without limitation, neodymium alloys (e.g., neodymium iron boron, NeFeB, or "NIM"), samarium cobalt (SmCo), ferromagnetic alloys (e.g., iron alloys also comprising aluminium, nickel, and cobalt, "Alnico"), and magnetic ceramics (e.g., ferrites, especially hard ferrites). NIM has been found to be a particularly suitable material for the magnet 30. Several grades of NIM are suitable including, without limitation, N35, N40, N42, N45, N48, N50, N52. Furthermore, where the magnet 30 is made of NIM, one or more of its surfaces may be plated with layers of, for example without limitation, one or more of: nickel, copper, zinc, chromium, gold, expoy (e.g., Ni—Cu—Ni layers, Ni, Cu—Ni—Au layers, Ni—Cu—Ni—Cr layers, Ni—Cu—Ni-epoxy layers, Zn layer, or Ni—Cu layers, etc.). As will be readily understood by persons of ordinary skill in the relevant art, the magnet 30 should be sized and shaped to enable the magnet 30 to fit into whatever intended position is provided (e.g., a magnet recess 44) on the female component body 40 (or male component body 80, depending on the embodiment of the device 10). For example, as in the embodiment shown in FIGS. 3-5 and 8-13, when the magnet recess 44 has a disk shape, in some embodiments, the magnet 30 may also have a disk shape with a diameter of about 0.375 inch and a thickness of from about 0.06 to about 0.0625 inch. In other similar embodiments, the magnet 30 may have a disk shape with a diameter of about 0.25 inch and a thickness of from about 0.06 inch to about 0.0625 inch.

Where the second magnetic element is a magnetically receptive wafer (i.e., metal wafer) 70, suitable materials for the metal wafer 70 include any magnetically receptive material, for example without limitation, steel, iron, nickel, manganese, cobalt, gadolinium, and combinations and alloys thereof. Moreover, one or more surfaces of the metal wafer 70 may be plated with one or more of nickel, zinc, chromium, or combinations or alloys thereof. Steel alloys have been found to be particularly suitable materials for the metal wafer 70. As will be readily understood by persons of ordinary skill in the relevant art, the metal wafer 70 should be sized and shaped to enable the metal wafer 70 to fit into whatever intended position is provided (e.g., a wafer recess 84) on the male component body 80 (or female component body 40, depending on the embodiment of the device 10). For example, as in the embodiment shown in FIGS. 6-7 and 14-17, when the wafer recess 84 has a generally square shape, in some embodiments, the metal wafer 70 may also have a generally square shape with sides having a length of about 10 millimeters (mm) and a thickness of about 0.478 mm. In other similar embodiments, the metal wafer 70 may have a generally square shape with sides having a length of about 0.12 mm and a thickness of about 0.478 mm.

Figure 4:
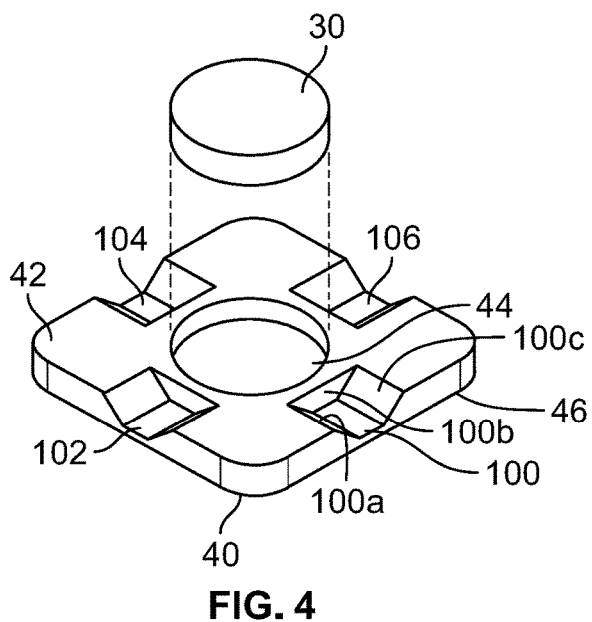
FIG. 4 is an exploded perspective view of the female component body and magnet in which the mating surface and magnet recess of the female component body are visible.
Figure 5:
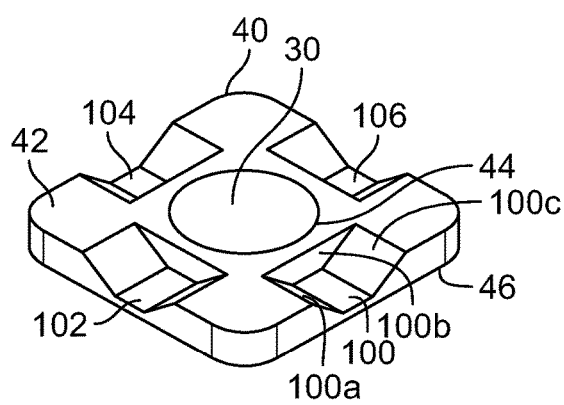
FIG. 5 is a perspective view of the assembled female component body and magnet.

As will be recognized by persons of ordinary skill in the relevant art, although the magnet 30 and the magnet recess 44 of the female component body 40 are shown having circular shapes in FIGS. 3-5 and 8, the circular shape is not required and other shapes such as rectilinear, oval, or even irregular shapes will be suitable as long as the magnet 30 is sized and shaped to fit flush into the recess 44 of the female component body 40 (see, e.g., FIGS. 4 and 5). Similarly, although the metal wafer 70 and the wafer recess 84 of the male component body 80 are shown having square shapes in FIGS. 2, 6-7 and 9, the square shape is not required and other shapes such as other rectilinear, oval, or even irregular shapes will be suitable as long as the metal wafer 70 is sized and shaped to fit flush into the recess 84 of the male component body 40 (see, e.g., FIGS. 2 and 7).

Furthermore, it is not necessary for the female component 20 to have the magnet 30 and the male component 60 to have the metal wafer 70. In other words, in some embodiments, the female component body 40 may have a wafer recess 84 for receiving the metal wafer 70 therein and the male component body 80 may have a magnet recess 44 for receiving the magnet 30 therein.

The magnet 30 is securely and permanently affixed to the female component body 40 in the recess 44 and the metal wafer 70 is securely and permanently affixed to the male component body 80 in the wafer recess 84, respectively, by gluing with an adhesive such as, without limitation, an acrylate (e.g., cyanoacrylate, alkyl acrylate such as methyl or ethyl methacrylate), rubberized cyanoacrylate, ultraviolet cured adhesive, anaerobic adhesive, and epoxy-based adhesives (e.g., including one- and two-part epoxy-based adhesives).

As will be described hereinbelow, the affixing agents 50, 52 on the first and second surfaces of 48, 88 of the female and male component bodies 40, 80 are used to permanently or removably affix each of the female and male components 20, 60 to a respective one of the back side of a wall mounted article and the wall on which the article is to be mounted. Where the affixing agents are first and second pieces of two sided adhesive foam 50, 52, as shown in the embodiment of the device 10 of FIGS. 1-3 and 6, suitable foam materials include, for example without limitation, urethanes, acrylics, polyethylenes, rubbers, silicones, and combinations thereof.

As will be familiar to persons of ordinary skill in the relevant art, the first and second pieces of two sided adhesive foam 50, 52 each have a pressure sensitive adhesive on both sides thereof, where the pressure sensitive adhesive may be, in each case and independently of the other, permanent, removable or repositionable. For example, one side of the first piece of two sided adhesive foam 50 may have a permanent pressure sensitive adhesive thereon for affixing the foam 50 to the first surface 48 of the female component body 40 (which also carries the magnet 30 in the magnet recess 44 on the female mating face 42 thereof), while the opposite side of the foam 50 may have a removable pressure sensitive adhesive thereon for affixing the foam 50 and female component 20 to the wall. Suitable pressure sensitive adhesives include, for example without limitation, acrylics, rubbers, silicone, and combinations thereof. Determination and selection of the type and material suitable for the pressure sensitive adhesives are well within the ability of persons of ordinary skill in the relevant art.

Various sizes and dimensions of the positioning and stabilizing device 10 and its components as described hereinabove, according to the present invention, are possible, as are recognizable and determinable by persons of ordinary skill in the art. The following exemplary dimensions are provided as guidance, without limitation or elimination of all reasonable alternatives. In one embodiment of the device 10, its general overall shape is a square having sides of from about 10 mm to about 50 mm in length each, which means that each of the female and male component bodies 40, 80 also have sides of from about 10 to about 50 mm in length each. For example, without limitation, the sides of the square-shaped embodiment of the device 10 may have a length of from about 15 to about 50 mm, or from about 15 to about 40 mm, or from about 15 to about 30 mm, or from about 15 to about 20 mm, or from about 10 to about 50 mm, or from about 10 to about 40 mm, or from about 10 to about 30 mm, or from about 10 to about 20 mm. In certain exemplary embodiments, the length of the sides of square-shaped female and male component bodies 40, 80 may be about 15 mm, or about 22 mm.

The particular size and dimensions of the other components and features of the device 10 will typically be bounded by the size of the female and male component bodies 40, 80. Again, the following exemplary dimensions are provided for guidance and should not be taken as limitations for the size of the other components and features of the device 10. For example, with reference to FIGS. 9, 10, 15 and 16, where each of the female and male component bodies 40, 80 have square shapes with sides each having a length (L) of about 15 mm, the magnet recess 44 of the female component body 40 may be circular, centered on the female mating face 42 and have a diameter (d) of about 6.86 mm. Furthermore, in such an embodiment, the interior distance (ID) between the innermost boundaries of oppositely positioned indents (e.g., 102, 106) on the female mating face 42 may be about 8.5 mm. The width of the floor (WF) of each indent (see, e.g., FIGS. 9 and 10) on the female component body 40 may be about 2 mm, while the width of the opening (WO) of each indent may be about 6 mm.

Also, in such an embodiment, the wafer recess 84 of the male component body 80 may have a square shape, be centered on the male mating face 82 and have sides each with a length (s) of about 8.5 mm. Furthermore, in such an embodiment, the interior distance (IM) between the innermost boundaries of oppositely positioned protrusions (e.g., 112, 116) on the male mating face 82 may be about 8.5 mm (e.g., to match and fit with, i.e., correspond to, the interior distance (IF) provided on the female mating face 42 of the female component body 40). The width of the top side (WT) of each protrusion (see, e.g., FIGS. 15 and 16) on the male component body 80 may be about 2 mm, while the total width of each protrusion (XT) of each indent may be about 6 mm (e.g., to match and fit, i.e., complement, the dimensions of the indents provided on the female mating face 42 of the female component body 40).

In another exemplary embodiment, with reference still to FIGS. 9, 10, 15 and 16, wherein each of the female and male component bodies 40, 80 have square shapes with sides each having a length (L) of about 20 mm, the magnet recess 44 of the female component body 40 may be circular, centered on the female mating face 42 and have a diameter (d) of about 10 mm. Furthermore, in such an embodiment, the interior distance (ID) between the innermost boundaries of oppositely positioned indents (e.g., 102, 106) on the female mating face 42 may be about 12.1 mm. The width of the floor (WF) of each indent (see, e.g., FIGS. 9 and 10) on the female component body 40 may be about 2 mm, while the width of the opening (WO) of each indent may be about 6 mm.

Also, in such an embodiment, the wafer recess 84 of the male component body 80 may have a square shape, be centered on the male mating face 82 and have sides each with a length (s) of about 12.5 mm. Furthermore, in such an embodiment, the interior distance (IM) between the innermost boundaries of oppositely positioned protrusions (e.g., 112, 116) on the male mating face 82 may be about 12.5 mm (e.g., to match and fit with, i.e., correspond to, the interior distance (IF) provided on the female mating face 42 of the female component body 40). The width of the top side (WT) of each protrusion (see, e.g., FIGS. 15 and 16) on the male component body 80 may be about 2 mm, while the total width of each protrusion (XT) of each indent may be about 6 mm (e.g., to match and fit, i.e., complement, the dimensions of the indents provided on the female mating face 42 of the female component body 40).

Methods for using the positioning and stabilizing device 10 will not be described with reference to FIGS. 19-23. As shown in FIGS. 19A and 19B, there is typically a preferred orientation (FIG. 19A) for a wall mounted article, such as a framed picture P, when hung or mounted on a wall W. However, after mounting, it often happens that the article P moves or shifts away from the preferred orientation, such as from a straight orientation (FIG. 19A) to a crooked orientation (FIG. 19B). The positioning and stabilizing device 10 described herein assists with both the initial positioning of such articles in their preferred orientation during mounting, as well as stabilizing such articles after mounting to minimize or prevent their movement away from the preferred orientation.

Generally, one of the female and male components 20, 60 of the positioning and stabilizing device 10 is affixed to the back side of the article P (using the affixing agents, for example, double sided adhesive foam 50, 52), while the other is affixed to the wall W (also (using the affixing agents, for example, double sided adhesive foam 50, 52), in relative orientation so that when the article P is mounted on the wall W, the female and male mating faces 42, 82 of the respective corresponding female and male components 20, 60 align and mate with one another in an assembled state (see, e.g., FIG. 1) and are held together in that assembled state (by the magnetic forces provided by the magnet 30 and metal wafer 70), thereby minimizing or preventing movement of the article P from its preferred orientation. Which of the female and male components 20, 60 is affixed to the article P or the wall W is not critical, as long as a corresponding female and male pair of components 20, 60, is used at each particular position where the article P is to be held to the wall W.

Figure 20A:
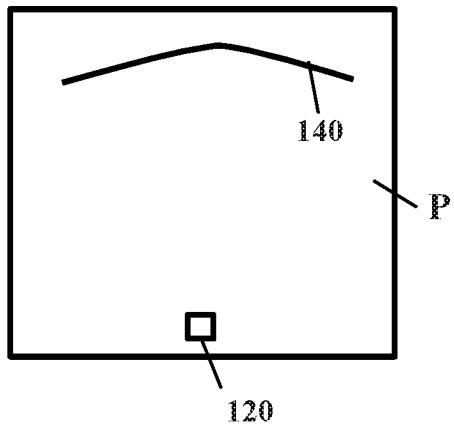
FIGS. 20A, 20B, 20C and 20D provide schematic diagrams showing various alternative placements for either the female or male component of the positioning and stabilizing device on the back of a framed picture.
Figure 20B:
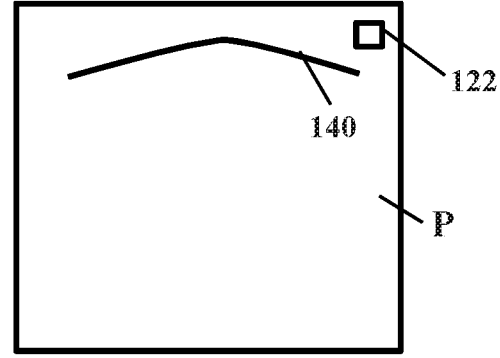
Figure 20C:
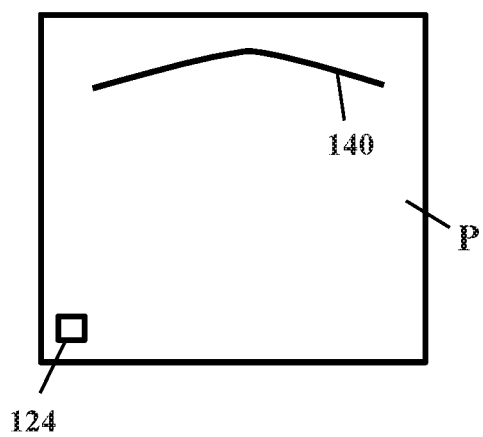
Figure 20D:
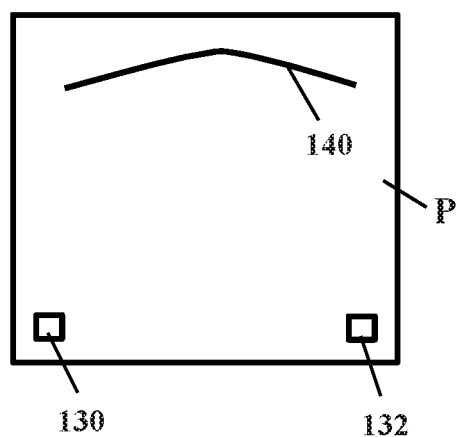

More particularly, as depicted in FIGS. 20A-20D, one or more devices 10 may be used for a single wall mounted article P. For example, a single device 10 may be used, wherein the female or male component 20, 60 is affixed to the back of the article P, for example without limitation, at a center location 120 (FIG. 20A), or some other location 122, 124, (FIGS. 20B and 20C, respectively). In some embodiments, two or more devices 10 may be used where the female or male component 20, 60 of each device (independently) is affixed to the back of the article P in two different locations 130, 132 (FIG. 20D). It is not necessary for the female component 20 of each device 10 used to be affixed to the article P. In other words, for example, the female component of a first device may be affixed to an article P, and the male component of a second device may also be affixed, but at a different position, to the same article, wherein the male component of the first device and the female component of the second device would be affixed to the wall W at positions which will align and enable mating with their respective female and male components.

The device 10 is not intended to replace or substitute for mounting hardware, such as a combination of nails, rings, hooks, wire, brackets, or other hardware, but rather to supplement such hardware and add positional stability to an article P mounted with such hardware. For instance, as shown in FIGS. 20A-20D, the article P may also have mounting hardware, such as a wire 140, which will cooperate with corresponding mounting hardware, such as a nail or screw 142 installed on the wall W (see, e.g., FIGS. 21 and 22).

Figure 21:
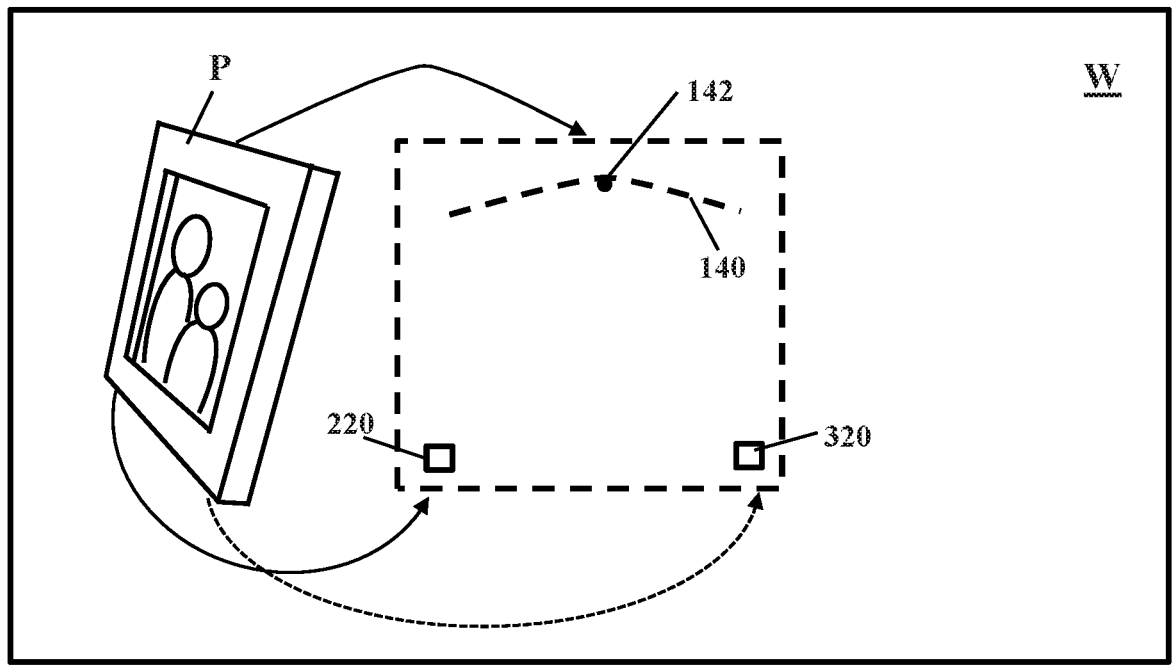
FIG. 21 provides a schematic diagram showing the placement of the female or male component of the positioning and stabilizing device, which correspond to those on the framed picture of FIG. 20D, on a wall on which the framed picture is to be mounted and stabilized.
Figure 22:
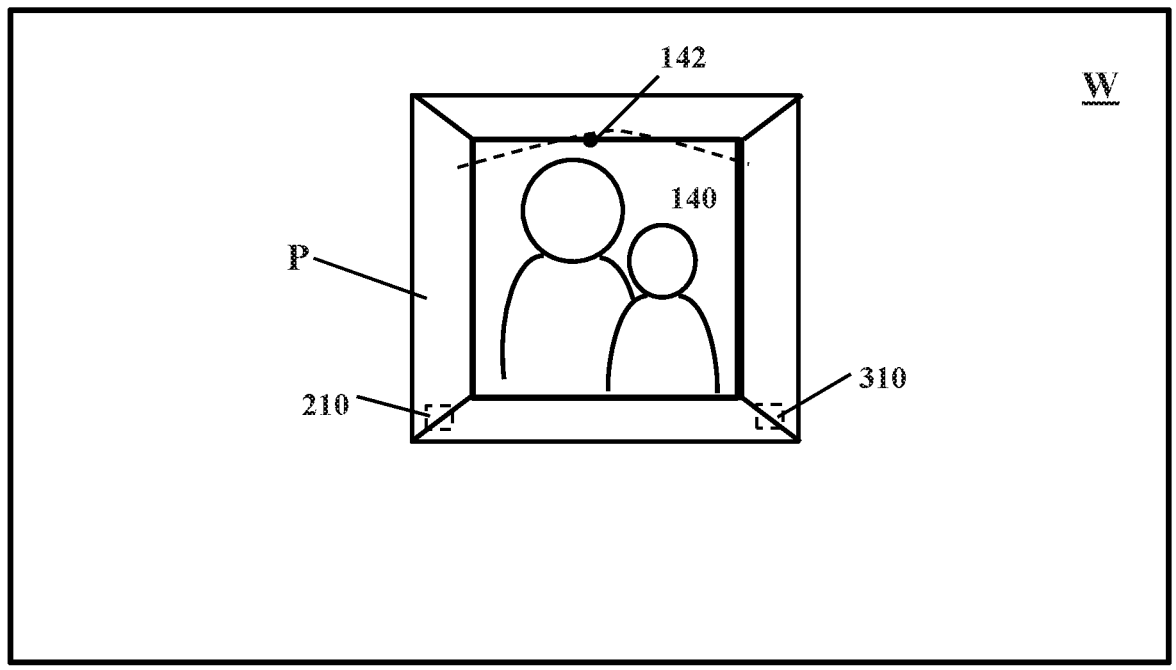
FIG. 22 provides a schematic diagram of the framed picture of FIG. 20D mounted on the wall and showing the placement two positioning and stabilizing devices each comprising mated female and male components.

In FIGS. 21 and 22, a framed picture P is shown being mounted on a wall W using two positioning and stabilizing devices 210, 310. For example, the female components 220, 320, may be affixed to the wall (FIG. 21), using their affixing agents (e.g., double sided adhesive foam, not shown per se) and the male components (not visible in FIG. 21, but arranged as shown in FIG. 20D) are affixed using their affixing agents (e.g., also double sided adhesive foam, not shown per se) to the framed picture P. FIG. 22 shows the framed picture P mounted on the wall W with a wire 140 and a nail 142 and stabilized in its preferred orientation with the two positioning and stabilizing devices 210, 310 shown in phantom.

Figure 23:
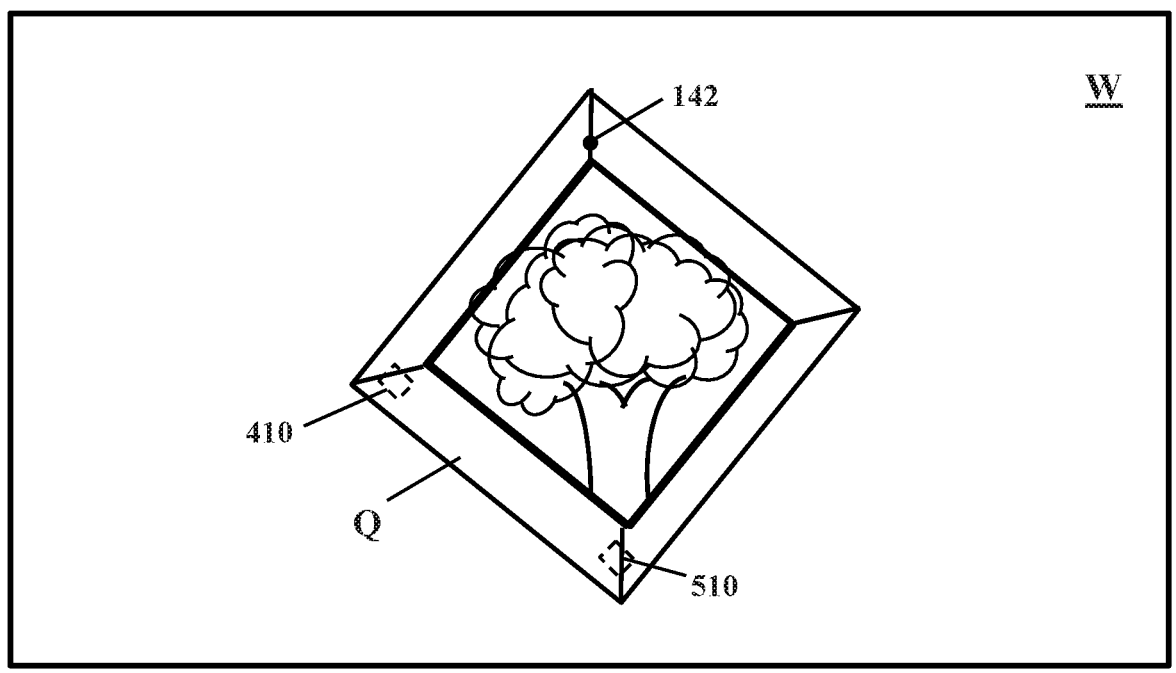
FIG. 23 provides a schematic diagram of a framed picture mounted on a wall in a different preferred orientation from that shown in FIGS. 21-22 and showing the placement of a positioning and stabilizing device comprising mated female and male components.

Of course, various preferred orientations are possible for wall mounted articles and the device according to the present invention facilitates positioning and stabilizing such articles in such varied preferred orientations. For example, FIG. 23 shows another article Q mounted on the wall W, in a different preferred orientation, using a nail 142 and two positioning and stabilizing devices 410, 510, shown in phantom, to maintain the article Q in its preferred orientation.

It will be understood that the embodiments of the present invention described hereinabove are merely exemplary and that a person skilled in the art may make variations and modifications, such as those described above and other, without departing from the spirit and scope of the invention. All such variations and modifications are intended to be included within the scope of the present invention.

The invention claimed is:

1. A positioning and stabilizing device comprising:
self-aligning and self-mating female and male components;
the female component including:
a body with a female mating face having a plane and a first face opposite the female mating face,
a first magnetic element, and
a first quantity, which equals at least two, first mating features on the female mating face,
both the first magnetic element and the at least one first mating feature being positioned on or proximate the female mating face,
wherein each of the at least two first mating features comprises an indent having an interior wall and a first end wall and a second end wall, wherein each of the first and second end walls is inclined at a first angle relative to the plane of the female mating face;
the male component including:
a body with a male mating face having a plane and a second face opposite the male mating face,
a second magnetic element, and
a second quantity, which is at least two, second mating features on the male mating face, wherein the second quantity of the second mating features is equal to the first quantity of the first mating features,
both the second magnetic element and the at least one second mating feature being positioned on or proximate the male mating face
wherein each of the at least two second mating features comprises a protrusion having an interior side and a first end side and a second end side, wherein each of the first and second end sides is inclined at a second angle relative to the plane of the male mating face,
wherein each protrusion is sized, shaped, and positioned on the male mating face to cooperate and mate with a corresponding one of the indents on the female mating surface of the female component, and
first and second affixing agents, wherein the first affixing agent is affixed to a first surface on the first face of the female component body, wherein the second affixing agent is affixed to a second surface on the second face of the male component body, wherein at least one of the first and second affixing agents includes a double sided adhesive foam piece;
wherein the first and second magnet elements are positioned on the respective female and male mating faces and align, contact and attract one another when the device is being assembled; and
wherein the at least two first mating features and the at least two second mating features are positioned on the respective female and male mating faces such that they align, contact and slidingly mate with one another in an assembled state to which they are drawn and in which they are held by magnetic attraction between the first and second magnet elements.

2. The device of claim 1, wherein the double sided adhesive foam piece has an adhesive applied to both sides thereof.

3. The device of claim 2, wherein the adhesive comprises a pressure sensitive adhesive.

4. The device of claim 1, wherein each of the first and second affixing agents include a first and second double sided adhesive foam piece, respectively.

5. A method of positioning and stabilizing an article on a generally vertically oriented structure having a generally vertical mounting surface, with the device of claim 1, comprising the steps of:
affixing one of the female and male components of the device to a back surface of the article with its mating surface exposed, and
affixing the other of the female and male components of the device to the generally vertical mounting surface with its mating surface exposed and in a predetermined position where the female and male components will align and the female and male mating surfaces will contact, mate with and attract one another;
mounting the article on the generally vertical mounting surface and assembling the device by positioning the female and male components proximate one another and allowing the first and second magnetic elements to slidingly align and draw each of the indents on the female mating surface into mating contact with a corresponding one of the protrusions on the male mating surface, thereby aligning and holding the article in a preferred orientation on the generally vertical mounting surface;
wherein the steps of affixing the affixing the female and male components of the device to the back surface of the article and the generally vertical mounting surface are performed using the first and second affixing agents.

\* \* \* \* \*